United States Patent
Jaklevic et al.

[11] 3,811,752
[45] May 21, 1974

[54] LIGHT REFLEX-REFRACTING COATING SYSTEM FOR COLORING METALS

[75] Inventors: Robert C. Jaklevic; John J. Lambe, both of Birmingham; Mati Mikkor, Ann Arbor; William C. Vassell, Dearborn, all of Mich.

[73] Assignee: Ford Motor Company, Dearborn, Mich.

[22] Filed: June 28, 1972

[21] Appl. No.: 266,890

[52] U.S. Cl. .................. 350/164, 350/166
[51] Int. Cl. ............................ G02b 5/28
[58] Field of Search .............. 350/104–109, 350/163–166, 311, 321

[56] References Cited
UNITED STATES PATENTS
3,700,305  10/1972  Bingham .................. 350/105

Primary Examiner—Ronald L. Wibert
Assistant Examiner—F. L. Evans
Attorney, Agent, or Firm—Joseph W. Malleck; Keith L. Zerschling

[57] ABSTRACT

A light reflex-refracting coating system effective to provide a resonant chamber for wavelengths of light desired to be trapped and transmit a selected sensible color from the object upon which the coating system is applied. The coating system has a base reflective surface, a dielectric coating such as aluminum oxide, having a thickness no greater than 500 angstroms, and an outer coating such as indium or tin, which is interrupted (such as by droplet formation in the thickness range of 500–10,000 A) to complete a resonant chamber.

6 Claims, 2 Drawing Figures

LIGHT REFLEX-REFRACTING COATING SYSTEM FOR COLORING METALS

BACKGROUND OF THE INVENTION

Although intensive studies have been made regarding the physiology as well as the psychological aspects of color sensation, among which there is some disagreement, the more prevalent theory is that it is the absence or subtraction of specific wavelengths of light that determine the ultimate color sensation perceived by the human eye mechanism. For example, a specific wavelength of light that is associated with blue, if it is eliminated from the spectrum of light entering the retina will transmit a color sensation by way of the optic nerves which is translated finally as yellow. As a multiple of wavelengths is subtracted from the incoming light, the concept of color perception becomes more complex but is generally theorized by the simple example.

The art of manufacturing interference filters is dependent in part on such theory for purposes of transmitting a specific color from an incident beam of heterochromatic light. Typically these interferences filters provide for two reflecting surfaces spearated by a distance which has a direct relation to the wavelength of the light to be removed by destructive interference. The phase difference of the wavelengths resonating within the filter and finally eminating therefrom contributes to the sensation of color. However, the art of making such interference filters requires relatively thick dielectric layers to space the reflective surfaces apart. Such art also relies upon spacing of two uniform continuous reflective surfaces (one of which has to be on a semi-transparent coating) to promote resonance and define the phase change.

SUMMARY OF THE INVENTION

In contrast to the prior art, this invention contemplates providing a resonant chamber for light comprised of a base material having a first reflective surface, a very thin dielectric coating or material effectively adhered thereover and an interrupted coating to provide the second of two spaced reflective surfaces. An important feature resides in the interruptions of the outer coating to promote a multiple of resonant chambers (oriented parallel to the base reflective surface) for the light passing into the dielectric creating a unique average velocity of light propagation therein. The thickness of the dielectric is maintained in a range which exhibits unique thinness over that known by the prior art and is typically less than one-fourth wavelength of heterochromatic visible light (a minimum dimension for resonancy); such thinness cooperates with the discontinuities of the outer coating to promote a synthetic change in the index of refraction for the resonant chamber. This peculiar interaction of the thinness of the dielectric, thickness of the outer coating, and unique discontinuity of the outer coating, appears to provide a dispersion relationship which considerably lowers the speed of light passing therethrough and increases the composite index of refraction.

DETAILED DESCRIPTION

Figure 1:
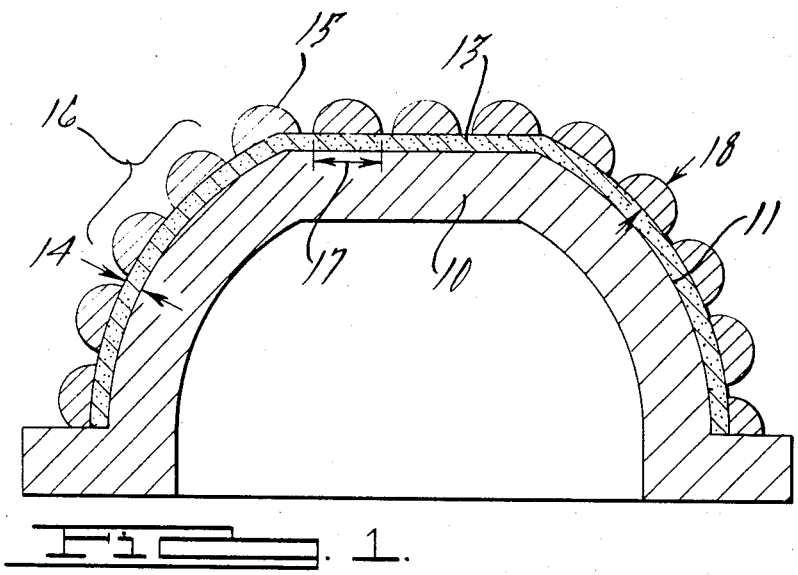
FIG. 1 is an enlarged schematic illustration of a preferred embodiment useful in coloring decorative trim.

The preferred embodiment, as will be described, comprises decorative coloring of trim work, but the invention is useful in various other applications. As illustrated in FIG. 1, a base 10 is provided which is constituted of unpolished aluminum metal and is easily formed in various configurations for trim applications. The base has an inherent reflective surface 11 derived from the characteristics of aluminum which comprise a transmission factor of 10 percent or less and a reflectivity value of 90 percent. A dielectric coating or layer 13 is provided over the reflective surface by anodizing the aluminum base for a period of time and under such power requirements as to generate an aluminum oxide constituting such coating and having a thickness 14 in the range of 10–300 angstroms. The dielectric coating ($Al_2O_3$) is not necessarily porous or absorbent and is tenaciously adhered to the base having a very high light transmission factor, a theoretical index of refraction of about 1.7 (speed of light compared to that in a vacuum), and there is very little light absorption therein.

Over the dielectric metal, indium is deposited which quickly draws into droplets or distorted globules as a result of surface tension; at elevated temperatures of the substrate, droplets are promoted because wetting is decreased and surface tension increased. The droplets together constitute an interrupted coating 16 which is discontinuous and undulated. It should be pointed out that other means, less convenient, may be employed to provide discontinuity, such as evaporation thru microscreening or cutting of continuous metal coating into islands by electron beams or lasers. Each droplet constitutes an opaque optical surface element and as a composite provide a series of minute reflective surfaces for defining one or more resonant chambers 17. The droplets are relatively uniform in shape but there is some variation; for example, the coating 16 may have droplets ranging in thickness 18 from 800–1,000 A, but the average coating thickness (taken from an average thickness line of the dielectric) will measure 200 A because of the undulations of the dielectric. For purposes of this invention, no portion of coating 16 should be greater than 1,500 angstrom and preferably should be in the range of 800 to 1,000 angstrom.

Specific variations of the ratio of thickness of the dielectric to the thickness of the interrupted coating, has rendered a repeatable and sensible color chart. For example, specific variations have given the following results for an aluminum - $Al_2O_3$- indium system:

|  | Sample 1 | Sample 2 | Sample 3 | Sample 4 |
|---|---|---|---|---|
| Dielectric Coating (Voltage). | 1.5 | 5.0 | 15.0 | 20.0 |
| Dielectric Coating (Average Thickness). | 21 Å | 70 Å | 210 Å | 280 Å |
| Interrupted Coating (Average Thickness). | 200 Å | 200 Å | 200 Å | 200 Å |
| Interrupted Coating (Island or Globule Thickness). | 500–1000 Å | 500–1000 Å | 500–1000 Å | 500–1000 Å |
| System Color. | Purple | Purple with yellow cast | Dark blue | Silvery green |

| Tartaric Acid Concentration (PH). | 5.5 | 5.5 | 5.5 | 5.5 |
|---|---|---|---|---|
| Current Density (Milliamps/cm²). | less than 100 | less than 100 | less than 100 | less than 100 |

The color identification is only a rough approximation since the precise definition is a combination of brightness, texture and background reflectivity. But the variation in the dielectric thickness has indicated emperically that the sensible color recognition can be varied in a predetermined and selective manner. Anodic oxidation treatment was used in the above samples, the aluminum base being made the anode in an electrolytic cell. An electrolyte solution of tartaric acid was used in concentrations indicated and current densities (in milliamps per square centimeter of anode surface) at voltages indicated.

Other dielectric materials within the teaching of this invention may comprise magnesium fluoride ($MgF_2$) deposited by vapor techniques over aluminum or silver, magnesium oxide (MgO) applied by air oxidation of magnesium film. This group is characterized by all having a very high light transmission value and a very low absorption value.

A specific example utilizing $MgF_2$ as the dielectric 13 over aluminum (with a thickness off 200 angstroms), and an interrupted coating of indium (average thickness 200 A), the sensible color was a bright golden yellow. The color was not unique to this sytem combination and can be comparable to a color achieved with a similar thickness ratio of different material.

For comparison, other examples were tried with the base material maintained as aluminum and the dielectric coating maintained as aluminum oxide; a different interrupted coating material was utilized in the form of tin droplets. For the same general dielectric thicknesses, the sensible color did not measurably shift as compared with an interrupted coating of indium. The general color of dark blue at 15 volts (determining dielectric thickness at constant conditions) was noticed and a silvery green was indicated at 30 volts which is somewhat equivalent to the 20 volts used with indium. The same result is to be expected if gold were to be substituted for tin.

Figure 2:
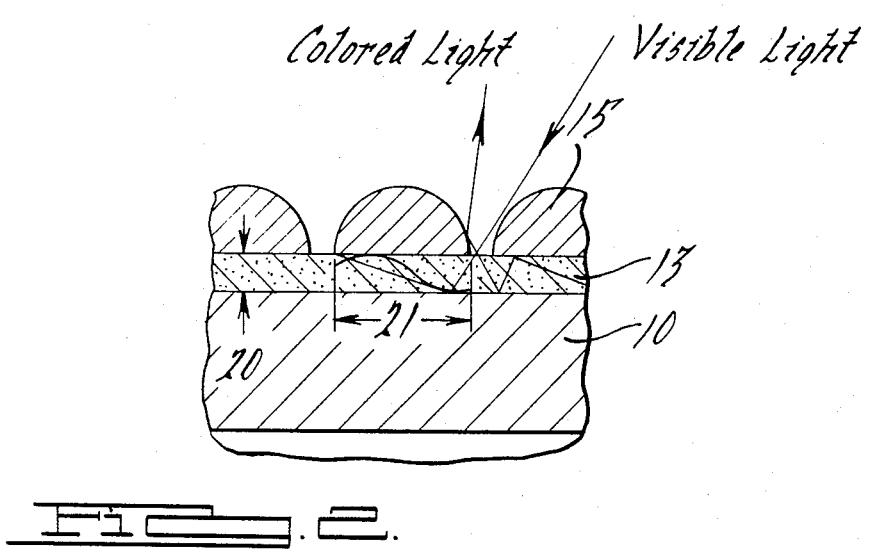
FIG. 2 is further enlargement of a portion of FIG. 1.

Although the underlying theory is not fully understood, it is believed that some partial selective absorption of the source light take place, this absorption is not due necessarily to wavelength interference or due to the absorption characteristic of the underlying base metal, but rather is due to the peculiar combination or interaction of the interrupted metallic reflective surface and the base reflective surface which together synthetically produce a very high index of refraction through the dielectric promoting a very slow propagation of the source light therein. Thus the normal relationship between the wavelength of light and index of refraction therein is substantially changed from that known in the prior art. The interrupted coating scale should be sufficiently fine at about 1,000 A, but can be operable within the range of 500–10,000 A. Each droplet is relatively opaque when in this form since light tends to scatter between the droplets rather than pass through the droplets even though the droplet material can be considered semi-transparent when in the uninterrupted condition (FIG. 2). It is believed the resonancy chamber has been reoriented from that known in the prior art where the critical resonancy dimension is the spacing 20 between reflective surfaces required to be greater than one-fourth wavelength of visible light, to that of dimension 21 oriented parallel to the reflective surfaces and is controlled by the interruption technique. Certain wavelength of visible light will begin to match the natural resonancy dimension of chamber 17 and continue to resonant or interfere therein thereby subtracting such wavelength from the emitted or sensed light.

The criticality of the thickness of the dielectric and interrupted coatings is to be emphasized. The system can be employed in many applications independent from that of a decorative coloring mechanism; for example, the coloring system can be placed in an environment where the absorbed films may accumulate and when so occurring the superimposed film changes the optical characteristics of the primary coloring system resulting in a change in sensible color and providing a signal. Detection of such change can be implemented manually or by the use of a suitable color sensor device providing an output signal which can trigger an indicating device.

We claim as our invention:

1. An optical system for coloring a body subject to incident light, comprising:
   a. a base having a reflective surface,
   b. a dielectric coating on said reflective surface having a relatively uniform thickness no greater than 500 angstrom, and
   c. a uniformly interrupted coating of material on said dielectric coating having a maximum thickness of 1,500 angstrom, said dielectric and interrupted coatings having a preselected thickness ratio effective to predominantly trap a predetermined color wavelength of said incident light therebetween for determining the sensible color of said body.

2. An optical coloring system as in claim 1, in which said interrupted coating and dielectric coating are effective to define a light resonant chamber oriented substantially parallel to said base reflective surface.

3. An optical coloring system as in claim 1, in which said reflective surface, dielectric, and interrupted coatings cooperate to define a resonant chamber characterized by a reflectance capability of 80 to 90 percent and an absorption characteristic of substantially 100 percent for selected wavelengths of light determined to be subtracted from the quantum of light entering said resonant chamber.

4. An optical coloring system as in claim 1, in which said base has a metallic reflective surface of a material selected from the group consisting of aluminum, magnesium; silver, and said interrupted coating is a metallic material selected from the group consisting of indium, tin and gold.

5. An optical coloring system as in claim 1, in which the dielectric coating is comprised of an oxide of said base.

6. An optical coloring system as in claim 1, in which said dielectric is comprised of a transparent material.

* * * * *